(12) United States Patent
Baek et al.

(10) Patent No.: US 11,206,572 B2
(45) Date of Patent: Dec. 21, 2021

(54) METHOD AND APPARATUS FOR PROCESSING DATA AT HIGH SPEED

(71) Applicant: Samsung Electronics Co., Ltd., Suwon-si (KR)

(72) Inventors: Sangkyu Baek, Yongin-si (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 16/610,537

(22) PCT Filed: Apr. 30, 2018

(86) PCT No.: PCT/KR2018/005000
§ 371 (c)(1),
(2) Date: Nov. 4, 2019

(87) PCT Pub. No.: WO2018/203637
PCT Pub. Date: Nov. 8, 2018

(65) Prior Publication Data
US 2020/0077298 A1 Mar. 5, 2020

(30) Foreign Application Priority Data
May 4, 2017 (KR) .......................... 10-2017-0057077

(51) Int. Cl.
*H04W 28/04* (2009.01)
*H04W 76/22* (2018.01)
(Continued)

(52) U.S. Cl.
CPC ........... *H04W 28/04* (2013.01); *H04W 76/22* (2018.02); *H04W 80/02* (2013.01); *H04W 92/20* (2013.01)

(58) Field of Classification Search
CPC ..... H04W 28/04; H04W 76/22; H04W 80/02; H04W 92/20; H04W 28/06
See application file for complete search history.

(56) References Cited

U.S. PATENT DOCUMENTS 8,208,416 B2 * 6/2012 Suzuki ................. H04W 56/00
370/310
8,396,037 B2 * 3/2013 Wu ........................ H04W 76/19
370/331
(Continued)

FOREIGN PATENT DOCUMENTS

KR  10-2014-0133346 A   11/2014
WO     2015/067823 A1    5/2015
WO     2016098982 A1     6/2016

OTHER PUBLICATIONS

Ericsson, "PDCP TS design principles", 3GPP TSG-RAN WG2 #97bis, Apr. 3-7, 2017, Tdoc R2-1702744, 4 pages.
(Continued)

*Primary Examiner* — Will W Lin

(57) ABSTRACT

The present disclosure relates to a 5G or pre-5G communication system for supporting a higher data transfer rate beyond a 4G communication system, such as LTE. An embodiment of the present invention may provide an operating method of a reception apparatus, the operating method comprising the steps of: receiving a signaling radio bearer (SRB) message; determining whether at least one SRB message has not been sequentially received; checking whether a reordering timer has expired, in case that the at least one SRB message has not been sequentially received; and determining a loss of the at least one SRB message in case that the reordering timer has expired.

12 Claims, 21 Drawing Sheets

(51) Int. Cl.
*H04W 80/02* (2009.01)
*H04W 92/20* (2009.01)

(56) References Cited

U.S. PATENT DOCUMENTS

| | | | | |
|---|---|---|---|---|
| 8,750,218 B2* | 6/2014 | McBeath | ............. | H04W 56/00 370/329 |
| 10,396,942 B2 | 8/2019 | Baek et al. | | |
| 2003/0012212 A1* | 1/2003 | Earnshaw | ............. | H04L 1/1621 370/428 |
| 2009/0207739 A1* | 8/2009 | Chun | ................... | H04L 1/1614 370/241 |
| 2012/0089892 A1* | 4/2012 | Kang | ..................... | H04L 1/188 714/799 |
| 2013/0088979 A1* | 4/2013 | Bi | ...................... | H04L 41/0816 370/252 |
| 2015/0156669 A1* | 6/2015 | Quan | ................... | H04L 69/321 370/216 |
| 2015/0289166 A1* | 10/2015 | Miao | ....................... | H04L 69/02 370/328 |
| 2016/0113058 A1 | 4/2016 | Jung et al. | | |
| 2016/0183221 A1 | 6/2016 | Yi et al. | | |
| 2017/0041767 A1 | 2/2017 | Vajapeyam et al. | | |
| 2017/0223578 A1* | 8/2017 | Hong | ....................... | H04L 1/00 |
| 2018/0206173 A1* | 7/2018 | Virtej | .................... | H04L 45/121 |
| 2018/0302822 A1* | 10/2018 | Yoon | ..................... | H04L 1/0014 |

OTHER PUBLICATIONS

Huawei et al., "TP for Reconsideration of higher layer split options", 3GPP TSG-RAN3 Meeting #95, Feb. 13-17, 2017, R3-170735, 3 pages.
Huawei et al., "Reconsideration of higher layer split options", 3GPP TSG-RAN3 Meeting #95, Feb. 13-17, 2017, R3-170733, 3 pages.
Nokia et al., "S-RLF with Tight Interworking", 3GPP TSG-RAN WG2 Meeting #97bis, Apr. 3-7, 2017, R2-1702631, 5 pages.
Ericsson, "Introduction of option 3—Dual Connectivity with NR in E-UTRAN—RAN3 parts", Change Request, 3GPP TSG-RAN WG3 Meeting #95bis, Apr. 3-7, 2017, R3-17xxxx, 46 pages.
"LTE; Evolved Universal Terrestrial Radio Access (E-UTRA); Packet Data Convergence Protocol (PDCP) specification (3GPP TS 36.323 version 14.2.0 Release 14)", ETSI TS 136 323 V14.2.0 (Apr. 2017), Apr. 10, 2017, 46 pages.
Supplementary European Search Report dated Mar. 6, 2020 in connection with European Patent Application No. 18 79 3875, 14 pages.
ISA/KR, International Search Report and Written Opinion of the International Search Authority, International Application No. PCT/KR2018/005000, dated Aug. 24, 2018, 10 pages.
Huawei, et al., "L2 Reordering and Retransmission Functions," R2-166195, 3GPP TSG-RAN WG2 Meeting #95bis, Kaoshsiung, Oct. 10-14, 2016, 5 pages.
Qualcomm Incorporation, "Considerations on SRB split bearer and direct bearer," R2-1703696, 3GPP TSG-RAN WG2 Meeting #97bis, Spokane, USA, Apr. 3-7, 2017, 4 pages.

* cited by examiner

FIG. 18

```
< DRB Configuration >
RadioBearer = 1
PDCP SN Size = 18-bit
PDCP Window Size = 2048
```

METHOD AND APPARATUS FOR PROCESSING DATA AT HIGH SPEED

CROSS-REFERENCE TO RELATED APPLICATIONS

This application is a 371 National Stage of International Application No PCT/KR2018/005000, filed Apr. 30, 2018, which claims priority to Korean Patent Application No. 10-2017-0057077, filed May 4, 2017, the disclosures of which are herein incorporated by reference in their entirety.

BACKGROUND

1. Field

The disclosure relates to a method for processing data at a high speed in a mobile communication system.

2. Description of Related Art

In order to meet the demand for wireless data traffic, which has been increasing since the commercialization of a 4th-generation (4G) communication system, efforts are being made to develop an improved 5th-generation (5G) communication system or pre-5G communication system. For this reason, a 5G communication system or pre-5G communication system is referred to as a beyond-4G-network communication system or a post-Long-Term-Evolution (LTE) system.

To achieve a high data transmission rate, implementation of a 5G communication system in an extremely high frequency (mmWave) band (for example, a 60 GHz band) is being considered. To alleviate the path loss of radio signals and to increase the transmission distance of radio signals in an extremely high frequency band, beamforming, massive multiple-input multiple-output (massive MIMO), full-dimensional MIMO (FD-MIMO), array antenna, analog beamforming, and large-scale antenna techniques are under discussion for implementation in a 5G communication system.

Further, to improve the network of the system, technical development for implementation of an evolved small cell, an advanced small cell, a cloud Radio Access Network (cloud RAN), an ultra-dense network, device-to-device (D2D) communication, wireless backhaul, a moving network, cooperative communication, coordinated multi-points (CoMP), and reception interference cancellation in 5G communication systems is progressing.

In addition, advanced coding modulation (ACM) schemes including hybrid FSK and QAM (FQAM) and sliding window superposition coding (SWSC) as well as advanced access techniques including filter bank multi-carrier (FBMC), non-orthogonal multiple access (NOMA), and sparse code multiple access (SCMA) are being developed for implementation in 5G systems.

SUMMARY

An embodiment of the disclosure is to provide a method and an apparatus for processing data at a high speed. An embodiment of the disclosure is also to enable stable data transmission even in the presence of a backhaul interface between a packet data convergence protocol (PDCP) layer and a radio link control (RLC) layer. Further, an embodiment of the disclosure is to solve a decrease in data processing speed due to update of a length field in concatenation. In addition, an embodiment is to solve the problem that an increasing number of bearer combinations can be supported and a supported bearer combination becomes complicated when connections with a plurality of base stations are supported.

An embodiment of the disclosure may provide an operating method of a reception device, the method including: receiving a signaling radio bearer (SRB) message; determining whether at least one SRB message is not sequentially received; identifying whether a reordering timer expires in case that the at least one SRB message is not sequentially received; and determining loss of the at least one SRB message in case that the reordering timer expires.

An embodiment of the disclosure may provide a reception device including: a transceiver configured to transmit and receive a signal; and a controller configured to perform control to receive a signaling radio bearer (SRB) message, to determine whether at least one SRB message is not sequentially received, to identify whether a reordering timer expires in case that the at least one SRB message is not sequentially received, and to determine loss of the at least one SRB message in case that the reordering timer expires.

According to an embodiment of the disclosure, it is possible to enable stable data transmission in an environment having a backhaul interface. Further, according to an embodiment of the disclosure, it is possible to support high-speed data processing. In addition, according to an embodiment of the disclosure, it is possible to simplify a bearer configuration in case that connections with a plurality of base stations are supported.

BRIEF DESCRIPTION OF THE DRAWINGS

FIG. 18 illustrates information for separately setting a sequence number and a window size according to an embodiment of the disclosure;

DETAILED DESCRIPTION

Figure 1:
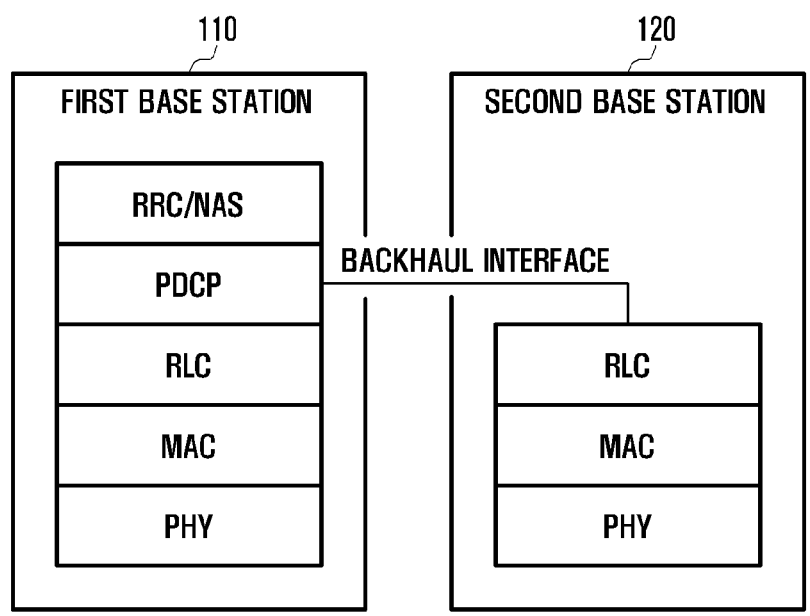
FIG. 1 illustrates a dual connectivity scenario to which the disclosure is applicable.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Figure 14:
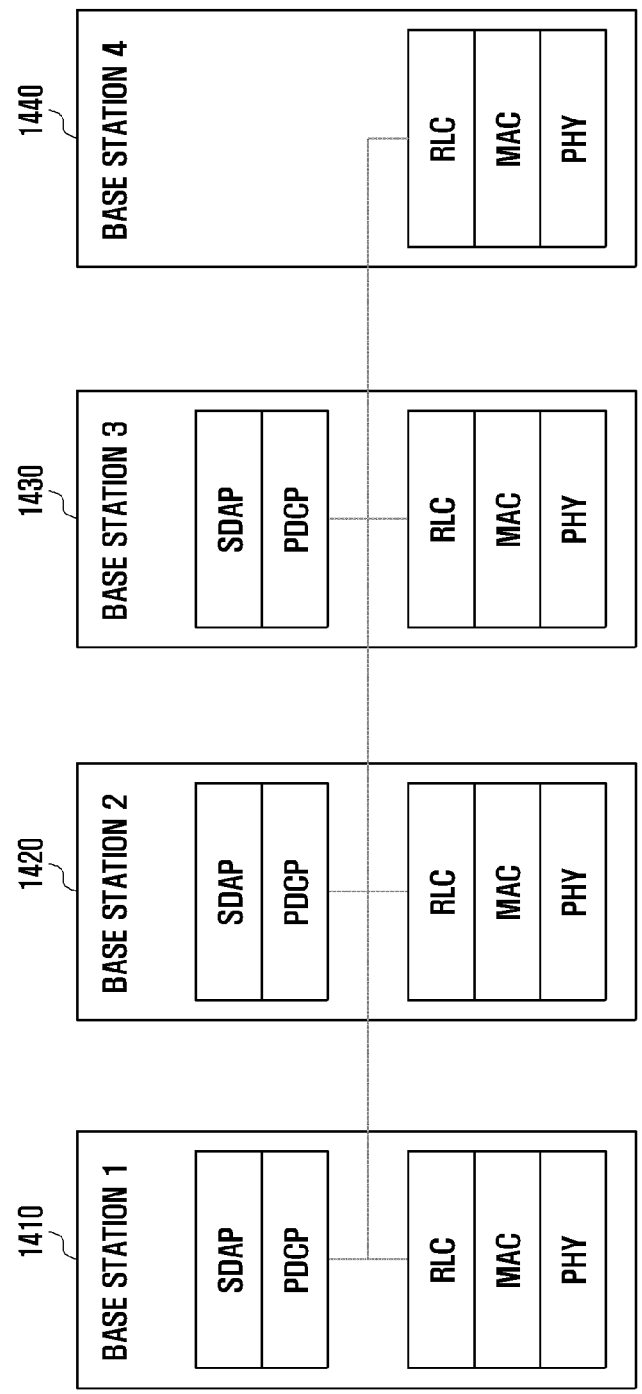
FIG. 14 illustrates a dual-connectivity or multi-connectivity environment which enables a connection with a plurality of base stations according to an embodiment of the disclosure.
Figure 15:
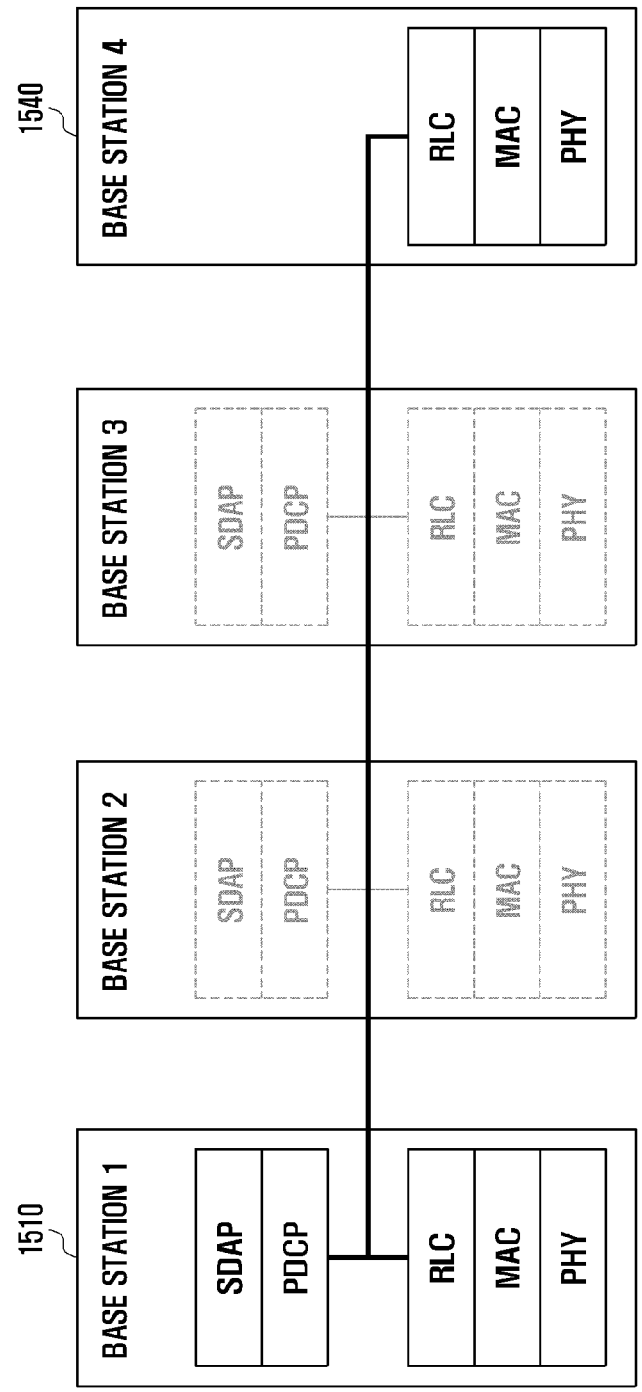
FIG. 15 illustrates a bearer configuration according to an embodiment of the disclosure.
Figure 16:
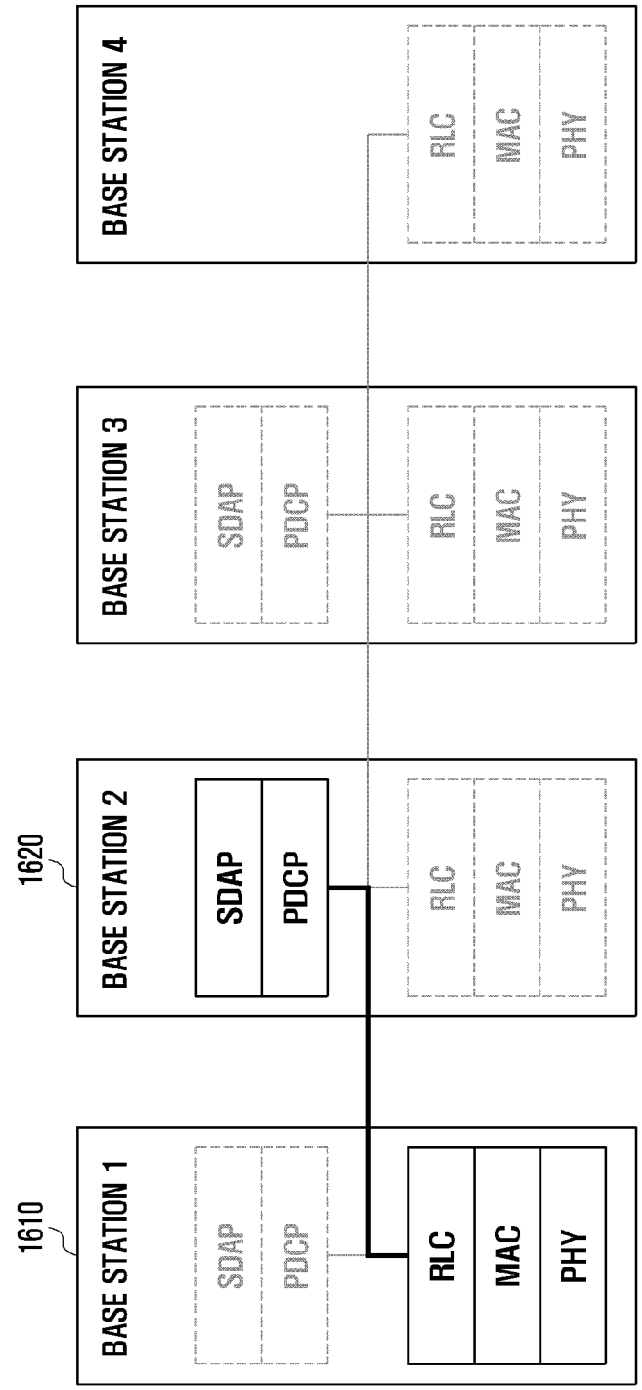
FIG. 16 illustrates another bearer configuration according to an embodiment of the disclosure.

FIG. 1 illustrates an example of a two-layer protocol stack in dual connectivity (DC) architecture as one scenario to which the disclosure is applicable. In the dual connectivity architecture, there are two base stations, which are referred to as a first base station 110 and a second base station 120, and each base station may have RLC and MAC layers at least per bearer. In the dual connectivity architecture, a particular bearer may be separated in a PDCP layer of one base station to be mapped to the RLC layers of the first base station 110 and the second base station 120. Here, the PDCP layer of the first base station 110 and the RLC layer of the second base station 120 may be connected via a backhaul interface. The backhaul interface may have a wireless or wired connection. Here, due to characteristics of the backhaul interface, a packet may be lost, which may cause a problem to the performance and the operation of a system. Although FIG. 1 illustrates the dual connectivity architecture including the two base stations, the disclosure may be extended to multi-connectivity architecture in which two or more base stations are connected as illustrated in FIG. 14 to FIG. 16.

Figure 2:
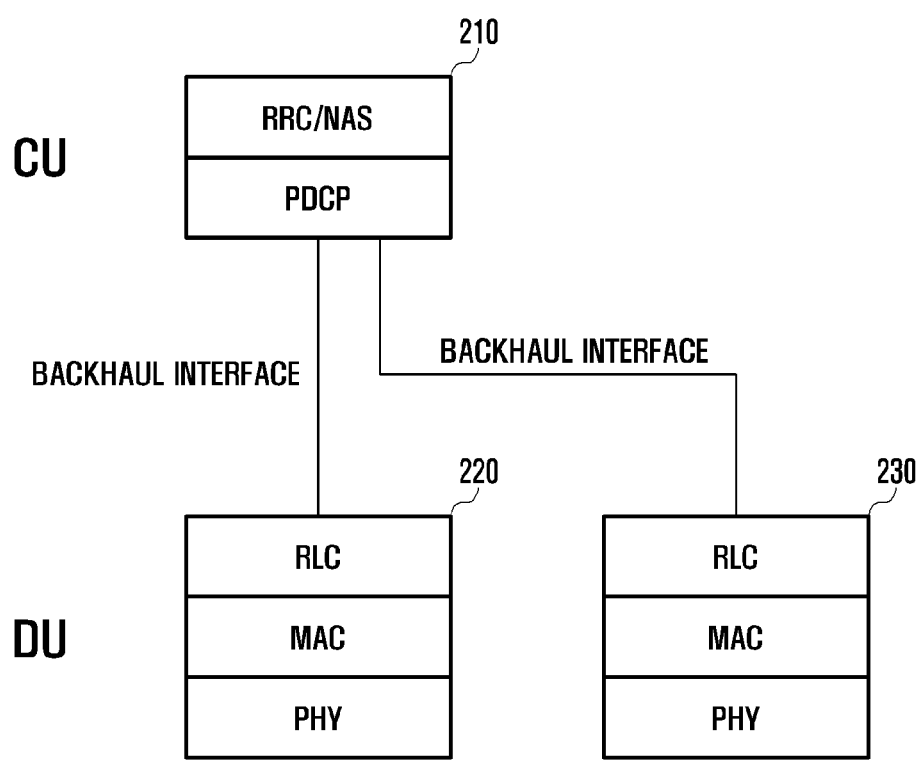
FIG. 2 illustrates CU-DU-split architecture to which the disclosure is applicable.
Figure 17:
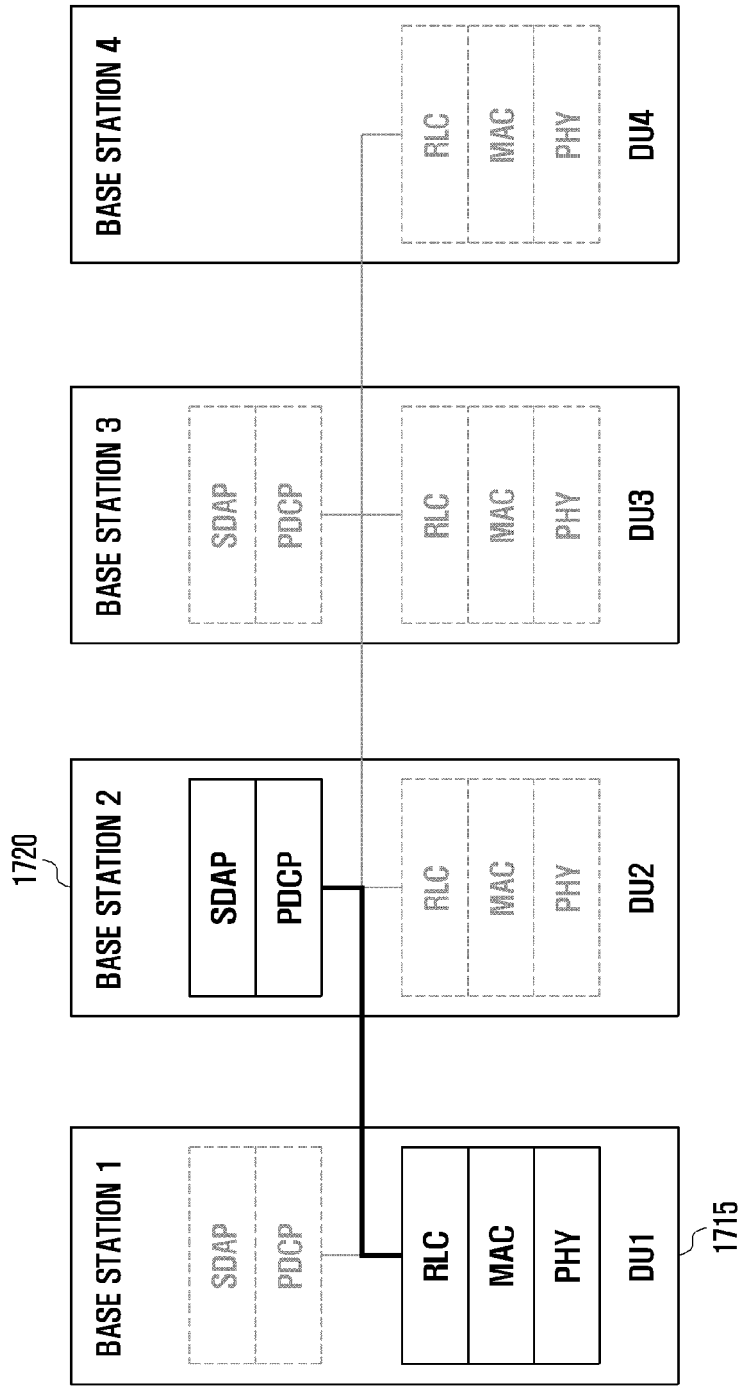
FIG. 17 illustrates a bearer configuration in CU-DU-split architecture according to an embodiment of the disclosure.

FIG. 2 illustrates a two-layer protocol stack in central unit (CU)-distributed unit (DU)-split architecture as one scenario to which the disclosure is applicable. The CU-DU-split architecture may also be extended to the dual connectivity architecture illustrated in FIG. 1 or multi-connectivity architecture. A CU 210 may have at least a PDCP layer for a particular bearer, and DUs 220 and 230 may have at least RLC and MAC layers for a particular bearer. In order to have dual connectivity architecture in the CU-DU-split architecture, a particular bearer may be separated in a PDCP layer of the CU 210 to be mapped to the RLC layers of a plurality of DUs 220 and 230. Here, the PDCP layer of the CU 210 and the RLC layers of the DUs 220 and 230 may be connected via a backhaul interface. The backhaul interface may have a wireless or wired connection. Here, due to characteristics of the backhaul interface, a packet may be lost, which may cause a problem to the performance and the operation of a system. Although FIG. 2 illustrates the dual connectivity architecture including the two base stations, the disclosure may be extended to multi-connectivity architecture in which two or more base stations are connected as illustrated in FIG. 17.

Figure 3:
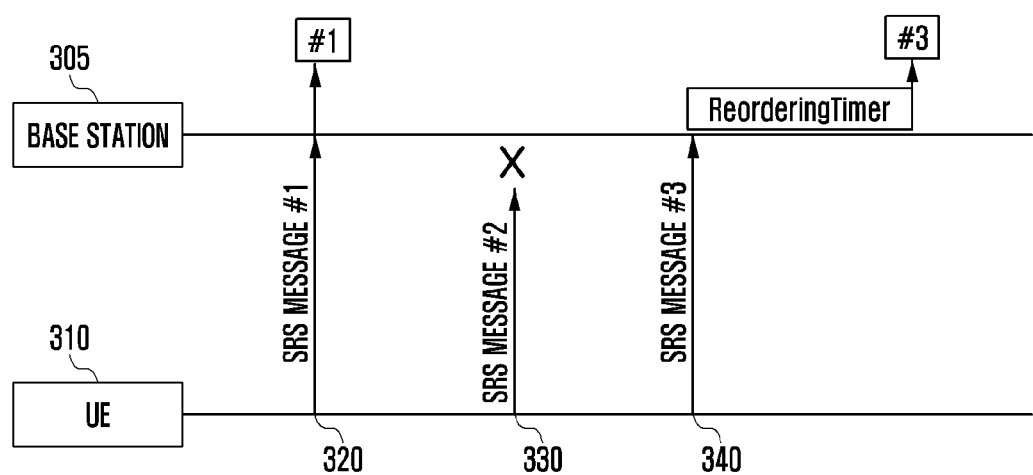
FIG. 3 illustrates a process of recognizing the loss of an SRB message according to an embodiment of the disclosure.

FIG. 3 illustrates a process of recognizing the loss of a signaling radio bearer (SRB) message according to an embodiment of the disclosure. Although the embodiment of FIG. 3 illustrates an example in which a UE 310 transmits an uplink SRB message to a base station 305, the embodiment may also be applied to a downlink SRB message transmitted from the base station 305 to the UE 310. The SRB message may include a radio resource control (RRC) message or a non-access stratum (NAS) message. The SRB message may include a message received through an SRB. In the embodiment of FIG. 3, the UE transmits three SRB messages (message #1, message #2, and message #3) to the base station. The UE 310 transmits SRB message #1 to the base station 305 in operation 320, transmits SRB message #2 to the base station 305 in operation 330, and transmits SRB message #3 to the base station 305 in operation 340. In the embodiment of FIG. 3, it is assumed that message #2 is lost. Here, the base station 305 recognizes that the messages are not sequentially received after receiving message #3. For example, the base station may recognize that the messages are not sequentially received on the basis of a PDCP sequence number (SN). The base station 305 identifies whether a reordering timer is operating. When the reordering timer is not operating, the base station 305 starts the reordering timer. After the reordering timer expires, the base station 305 recognizes that message #2 is lost. For an SRB message, the loss of a packet loss may cause a serious problem to the performance and operation of a system. Therefore, a receiver, that is, the base station 305, needs to recognize the loss of message #2 after the reordering timer expires and needs to perform a procedure for recovering message #2 or preparing for the loss. That is, according to the embodiment of the disclosure, the base station identifies that SRB messages are not sequentially received, operates a reordering timer, and identifies the loss of an SRB message in case that the reordering timer expires. A procedure for applying a reordering timer for an SRB message and reconstructing a lost message after the reordering timer expires is proposed as a new method according to an embodiment of the disclosure.

Figure 4:
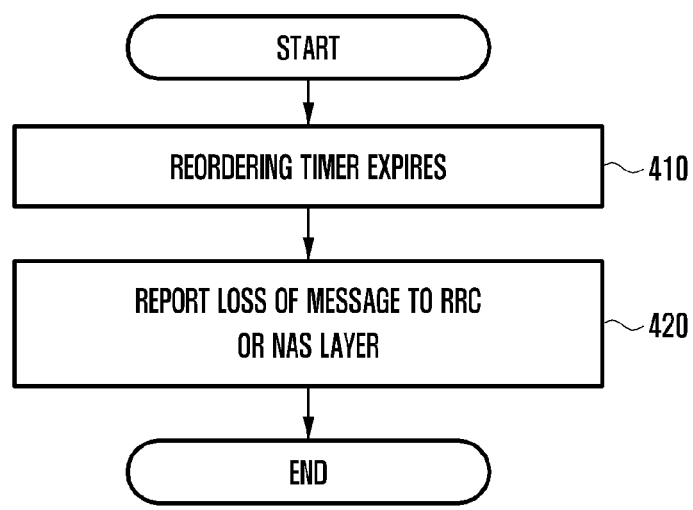
FIG. 4 illustrates a procedure for reconstructing a lost SRB message according to an embodiment of the disclosure.

FIG. 4 illustrates a procedure for reconstructing a lost SRB message according to an embodiment of the disclosure. The procedure of FIG. 4 may be a procedure subsequent to the procedure of FIG. 3. Although FIG. 4 describes the procedure with reference to a base station by way of example, the procedure may equally be applied to the case where a UE receives a downlink SRB message as described in FIG. 3. Referring to FIG. 4, in operation 410, the base station identifies that a reordering timer has expired. After the reordering timer expires, the loss of message #2 may be reported to an upper layer of the base station in operation 420. For example, a PDCP layer of the base station may report a lost SRB message to the upper layer of the base station. Here, the upper layer may be an RRC layer, an NAS layer, or a QoS layer. When reporting the loss of message #2 to the upper layer, a PDCP Sequence Number (SN) of the lost message may also be reported, or only the loss of an SRB message may be reported. A receiver, that is, the base station, may perform a procedure for reconstructing the lost SRB message on the basis of this report. The base station may request retransmission of the lost SRB message. When it is impossible to reconstruct the lost SRB message while maintaining the current connection, the base station may perform an operation for connection reestablishment.

Figure 5:
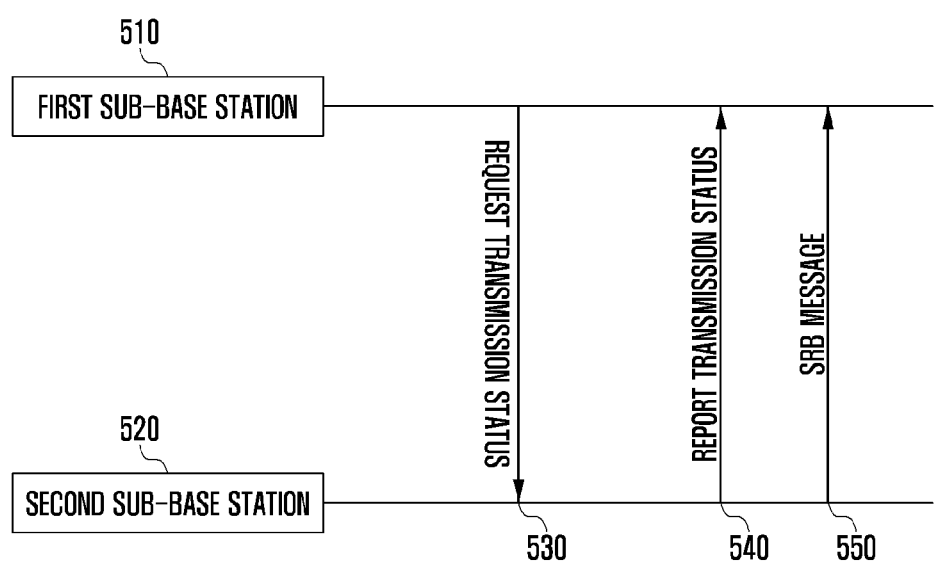
FIG. 5 illustrates a procedure for reconstructing a lost SRB message according to an embodiment of the disclosure.

FIG. 5 illustrates a procedure for reconstructing a lost SRB message according to an embodiment of the disclosure. After the loss of an SRB message is determined according to the embodiments of FIG. 3 and FIG. 4, a base station determining the loss of the SRB message may request the transmission status of the SRB message and retransmission of the lost message. In the embodiment of FIG. 5, the base station determining the loss of the SRB message is referred to as a first sub-base station 510, and the first sub-base station 510 is assumed to be a base station including a PDCP layer, an RRC layer, an NAS layer, or a QoS layer. The first sub-base station 510 may be a CU, and a second sub-base station 520 may be a DU. In addition, the first sub-base station 510 may be a master base station in DC, and the second sub-base station 520 may be a secondary base station. In operation 530, one of the PDCP, the RRC layer, the NAS layer, or the QoS layer of the first sub-base station 510 may request the transmission status of an SRB message from the base station (second sub-base station 520) including an RLC layer. Here, the transmission status may be at least one of the number of SRB messages transmitted for a specified time, a message type, or a message number. In operation 540, the second sub-base station 520 may report information about a message, which is transmitted to the first sub-base station 510, to the first sub-base station 510. Alternatively, in operation 550, the second sub-base station 520 may transmit an SRB message, which is not received by the first sub-base station 510, to the first sub-base station 510.

Figure 6:
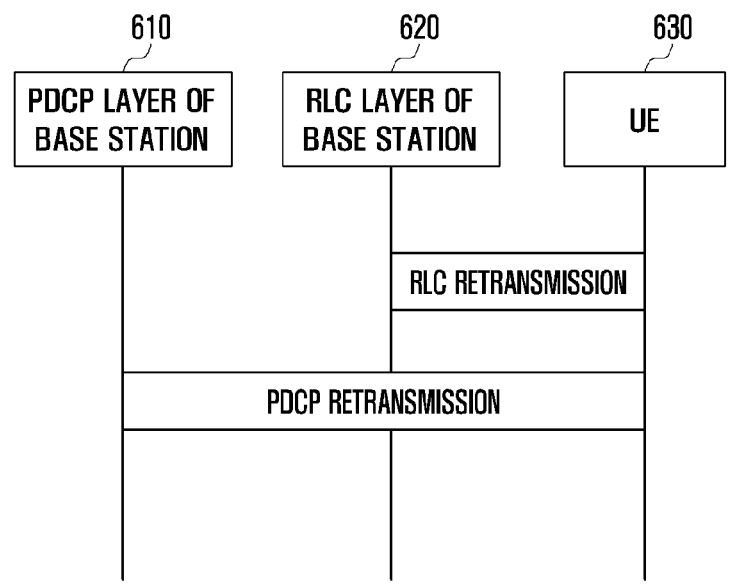
FIG. 6 illustrates an entity performing retransmission according to an embodiment of the disclosure.

FIG. 6 illustrates an entity performing retransmission according to an embodiment of the disclosure. In a communication system, an RLC layer is generally responsible for retransmission between a base station and a UE. However, in case that a backhaul interface connects an RLC layer and a PDCP layer as in the environment of FIG. 1 or FIG. 2, retransmission by the RLC layer may not guarantee full data transfer due to constraints of the backhaul interface. In this case, retransmission by the PDCP layer may be applied for assistance. In the embodiment of FIG. 6, an RLC layer 620 of a base station is responsible for retransmission between the base station and a UE 630, and a PDCP layer 610 of the base station is responsible for retransmission related to loss between the PDCP layer 610 of the base station and the RLC layer 620 of the base station. After the reordering timer of FIG. 3 expires, a receiver may transmit a status report message about an SRB message to a transmitter, thereby reporting to the transmitter that there is a missed SRB message. According to an embodiment, a PDCP layer of the receiver may periodically transmit a status report message to the transmitter. A PDCP layer of the transmitter may perform retransmission on the basis of this message.

Figure 7:
FIG. 7 illustrates a header format to which conventional concatenation is applied.

FIG. 7 illustrates a header format to which conventional concatenation is applied. Concatenation refers to a process of combining data packets (service data units: SDUs) into one protocol data unit (PDU). In case that concatenation is performed, a length field is included in a header 710 of a concatenating layer to include length information about concatenated SDUs in order to reconstruct a concatenated PDU. However, since this length field is finally updated after the concatenation is completed, front data including the header cannot be transmitted down to a lower layer until the entire concatenation is completed. Here, the lower layer may be a channel coding function of a physical layer. Information that may be included in the length field may be the sum of the lengths of concatenated SDUs, the number of concatenated SDUs, and the length of each SDU. In case that concatenated SDUs have the same length, the information may include the length of one SDU and the number of concatenated SDUs. An indicator indicating whether concatenated SDUs have the same length or different lengths may be included.

Figure 8:
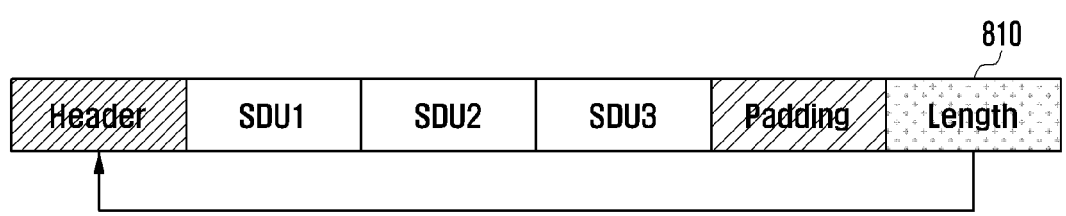
FIG. 8 illustrates a header format to which concatenation is applied according to an embodiment of the disclosure.

FIG. 8 illustrates a header format to which concatenation is applied according to an embodiment of the disclosure. In case that concatenation is performed as in the embodiment of FIG. 7, it is required to finally update the length field. In the embodiment of FIG. 8, a length field 810 of a header field is disposed after a PDU. In case that concatenation is performed, packets may be concatenated after inserting only an essential field, such as a logical channel ID, into the header field. Here, length information about each SDU may be stored in a concatenation function and may then be inserted immediately after the last SDU or after all PDUs after the concatenation is terminated. Here, padding may be disposed immediately before the length field 810. Information that may be included in the length field 810 may be the sum of the lengths of concatenated SDUs, the number of concatenated SDUs, and the length of each SDU. In case that concatenated SDUs have the same length, the information may include the length of one SDU and the number of concatenated SDUs. An indicator indicating whether concatenated SDUs have the same length or different lengths may be included. A receiver may separate the concatenated SDUs after reading the header field at the front and the length field at the rear.

The header field may include SDU concatenation information. The SDU concatenation information may be position information about the length field 810. The SDU concatenation information may be interpreted as indicating that SDUs are not concatenated in case that the length field is positioned at the front, and as indicating that SDUs are concatenated in case that the length field is positioned at the rear. In another embodiment, the SDU concatenation information may be represented by a one-bit indicator indicating whether SDUs are concatenated.

In another embodiment, the length field may be disposed behind the PDU regardless of whether SDUs are concatenated.

Figure 9:
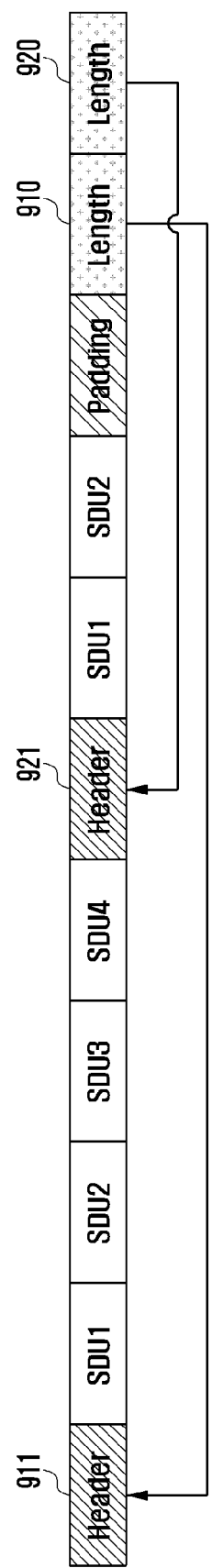
FIG. 9 illustrates another header format to which concatenation is applied according to an embodiment of the disclosure.

FIG. 9 illustrates a header format to which concatenation is applied according to an embodiment of the disclosure. In case that concatenation is performed as in the embodiment of FIG. 7, it is required to finally update the length field. In the embodiment of FIG. 9, a length field of a header field is disposed after a PDU. In case that concatenation is performed, packets may be concatenated after inserting only an essential field, such as a logical channel ID, into the header field. Here, the length of each SDU may be stored in a concatenation function and may then be inserted after all PDUs after the concatenation is terminated. Here, padding may be disposed immediately before the length field 910. In another embodiment, padding may be disposed immediately after the last SDU of each PDU (is not disposed after the length field). In the embodiment of FIG. 9, it is assumed that there are two PDUs including concatenated SDUs. Each piece of concatenated data may be SDUs in the same logical channel. Here, length fields 910 and 920 corresponding to respective concatenated headers exist. These length fields may be disposed together at the end of the PDUs. In the embodiment of FIG. 9, a first length field 910 of the length fields 910 and 920 may be a length field corresponding to a first header 911, and a second length field 920 may correspond to a second header 921. Information that may be included in the length fields 910 and 920 may be the sum of the lengths of concatenated SDUs, the number of concatenated SDUs, and the length of each SDU. In case that concatenated SDUs have the same length, the information may include the length of one SDU and the number of concatenated SDUs. An indicator indicating whether concatenated SDUs have the same length or different lengths may be included. A receiver may separate the concatenated SDUs after reading the header field at the front and the length field at the rear.

The head fields 911 and 921 may include SDU concatenation information. The SDU concatenation information may be position information about the length fields 910 and 920. The SDU concatenation information may be interpreted as indicating that SDUs are not concatenated in case that the length field is positioned at the front, and as indicating that SDUs are concatenated in case that the length field is positioned at the rear. In another embodiment, the SDU concatenation information may be represented by a one-bit indicator indicating whether SDUs are concatenated.

In another embodiment, the length fields 910 and 920 may be disposed behind the PDUs regardless of whether SDUs are concatenated.

Figure 10:
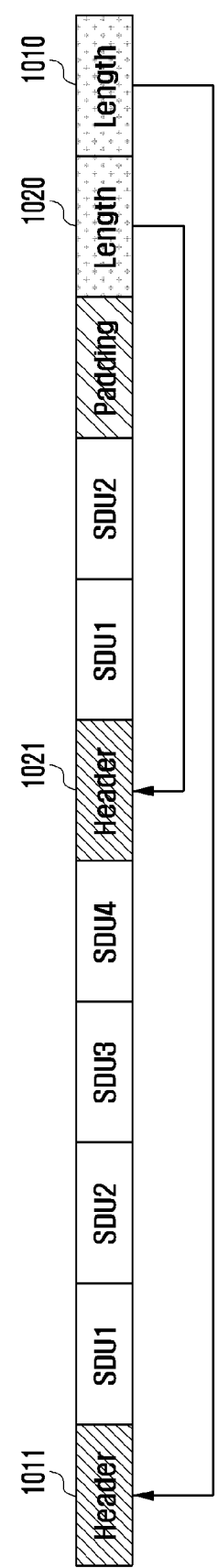
FIG. 10 illustrates still another header format to which concatenation is applied according to an embodiment of the disclosure.

FIG. 10 illustrates a header format to which concatenation is applied according to an embodiment of the disclosure. In case that concatenation is performed as in the embodiment of FIG. 7, it is required to finally update the length field. In the embodiment of FIG. 10, a length field of a header field is disposed after a PDU. In case that concatenation is performed, packets may be concatenated after inserting only an essential field, such as a logical channel ID, into the header field. Here, length information about each SDU may be stored in a concatenation function and may then be inserted after all PDUs after the concatenation is terminated. Here, padding may be disposed immediately before the length field 1020. In another embodiment, padding may be disposed immediately after the last SDU of each PDU (is not disposed after the length field). In the embodiment of FIG. 10, it is assumed that there are two PDUs including concatenated SDUs. Each piece of concatenated data may be SDUs in the same logical channel. Here, length fields 1010 and 1020 corresponding to respective concatenated headers exist. These length fields 1010 and 1020 may be disposed together at the end of the PDUs. In the embodiment of FIG. 10, the last length field 1010 of the length fields may be a length field corresponding to a first header 1011, and the second last length field 1020 may correspond to a second header 1021. In this manner, the first length field may correspond to the last header. Information that may be included in the length fields may be the sum of the lengths of concatenated SDUs, the number of concatenated SDUs, and the length of each SDU. In case that concatenated SDUs have the same length, the information may include the length of one SDU and the number of concatenated SDUs.

An indicator indicating whether concatenated SDUs have the same length or different lengths may be included. A receiver may separate the concatenated SDUs after reading the header field at the front and the length field at the rear.

The head fields 1011 and 1021 may include SDU concatenation information. The SDU concatenation information may be position information about the length fields 1010 and 1020. The SDU concatenation information may be interpreted as indicating that SDUs are not concatenated in case that the length field is positioned at the front, and as indicating that SDUs are concatenated in case that the length field is positioned at the rear. In another embodiment, the SDU concatenation information may be represented by a one-bit indicator indicating whether SDUs are concatenated.

In another embodiment, the length fields 1010 and 1020 may be disposed behind the PDUs regardless of whether SDUs are concatenated.

Figure 11:
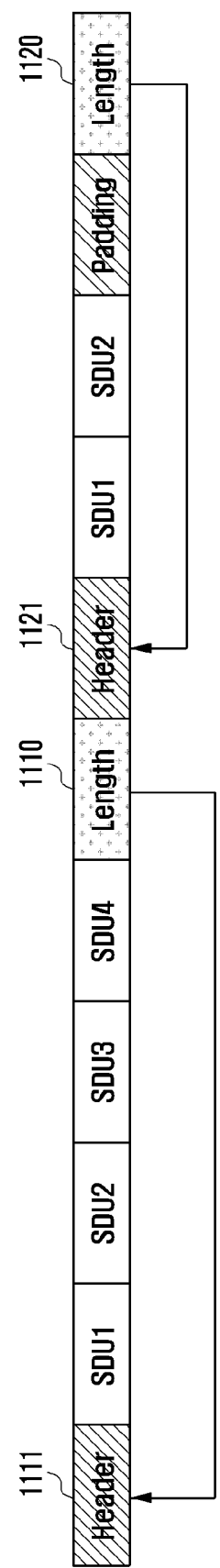
FIG. 11 illustrates yet another header format to which concatenation is applied according to an embodiment of the disclosure.

FIG. 11 illustrates a header format to which concatenation is applied according to an embodiment of the disclosure. In case that concatenation is performed as in the embodiment of FIG. 7, it is required to finally update the length field. In the embodiment of FIG. 11, a length field of a header field is disposed after a PDU. In case that concatenation is performed, packets may be concatenated after inserting only an essential field, such as a logical channel ID, into the header field. Here, a length field about each SDU may be stored in a concatenation function and may then be inserted immediately after the last SDU or after all PDUs after the concatenation is terminated. In case that other SDUs are separately concatenated, a header 1121 for the other SDUs may be disposed after the length field 1110, and a length field 1120 corresponding to this concatenation may be disposed after the SDUs likewise. Here, padding may be disposed immediately before the last length field 1120 in the PDU. Information that may be included in the length fields 1110 and 1120 may be the sum of the lengths of concatenated SDUs, the number of concatenated SDUs, and the length of each SDU. In case that concatenated SDUs have the same length, the information may include the length of one SDU and the number of concatenated SDUs. A receiver may separate the concatenated SDUs after reading the header field at the front and the length field at the rear.

The head fields 1111 and 1121 may include SDU concatenation information. The SDU concatenation information may be position information about the length fields 1110 and 1120. The SDU concatenation information may be interpreted as indicating that SDUs are not concatenated in case that the length field is positioned at the front, and as indicating that SDUs are concatenated in case that the length field is positioned at the rear. In another embodiment, the SDU concatenation information may be represented by a one-bit indicator indicating whether SDUs are concatenated.

In another embodiment, the length fields may be disposed behind the PDUs regardless of whether SDUs are concatenated.

Figure 12:
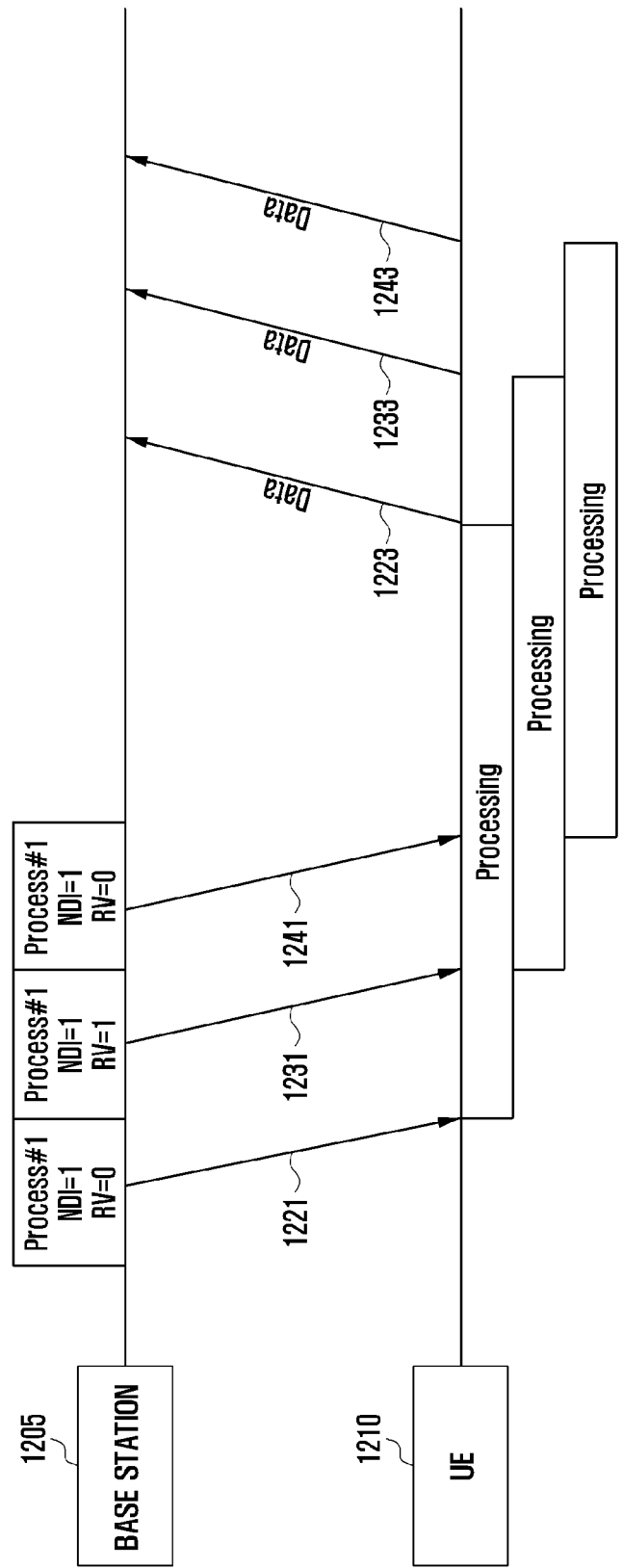
FIG. 12 illustrates a process of performing redundant transmission without feedback in uplink data transmission according to an embodiment of the disclosure.

FIG. 12 illustrates a process of performing redundant transmission without feedback in uplink data transmission according to an embodiment of the disclosure.

At the beginning of FIG. 12, a base station 1205 may notify a UE 1210 of data transmission in HARQ process #1 (operation 1221). Here, the base station indicates that new data is transmitted in HARQ process #1 by assuming a new data indicator (NDI) value to be 1 and sets a redundancy version (RV) to 0. The UE 1210 may decode this message from a physical downlink control channel (PDCCH) and may then transmit data after a predetermined time via data processing (operation 1223). Generally, the base station 1205 may request retransmission or may request transmission of new data transmission depending on the success/failure of data transmission.

In the embodiment of FIG. 12, however, the base station 1205 may request data transmission in the same HARQ process (HARQ process #1 in the embodiment of FIG. 12) with the same NDI value therebefore regardless of the success/failure of corresponding data transmission (before the base station determines the success/failure of uplink data transmitted by the UE) (operation 1231). Here, the RV value may be changed. The UE 1210 may decode this message from a PDCCH and may then transmit data after a predetermined time via data processing (operation 1233). Likewise, the base station may request further data transmission (operation 1241). The UE may decode this message from a PDCCH and may then transmit data after a predetermined time via data processing (operation 1243). In the embodiment of FIG. 12, it is assumed that such repeated data transmission is performed regardless of the success/failure of data transmission, which enables fast data retransmission and stable transmission. Here, HARQ feedback indicating whether data is successfully received may be transmitted for each data transmission, or only once for data received for a predetermined time.

In the embodiment of FIG. 12, in case that redundant transmission is performed, a logical channel processed in a corresponding HARQ process may be limited to a resource, such as a PDCCH. For example, only logical channels for packet duplication may be included in transmission. To this end, in first resource allocation (NDI toggling), the base station may specify that only a specific logical channel is included in transmission.

Figure 13:
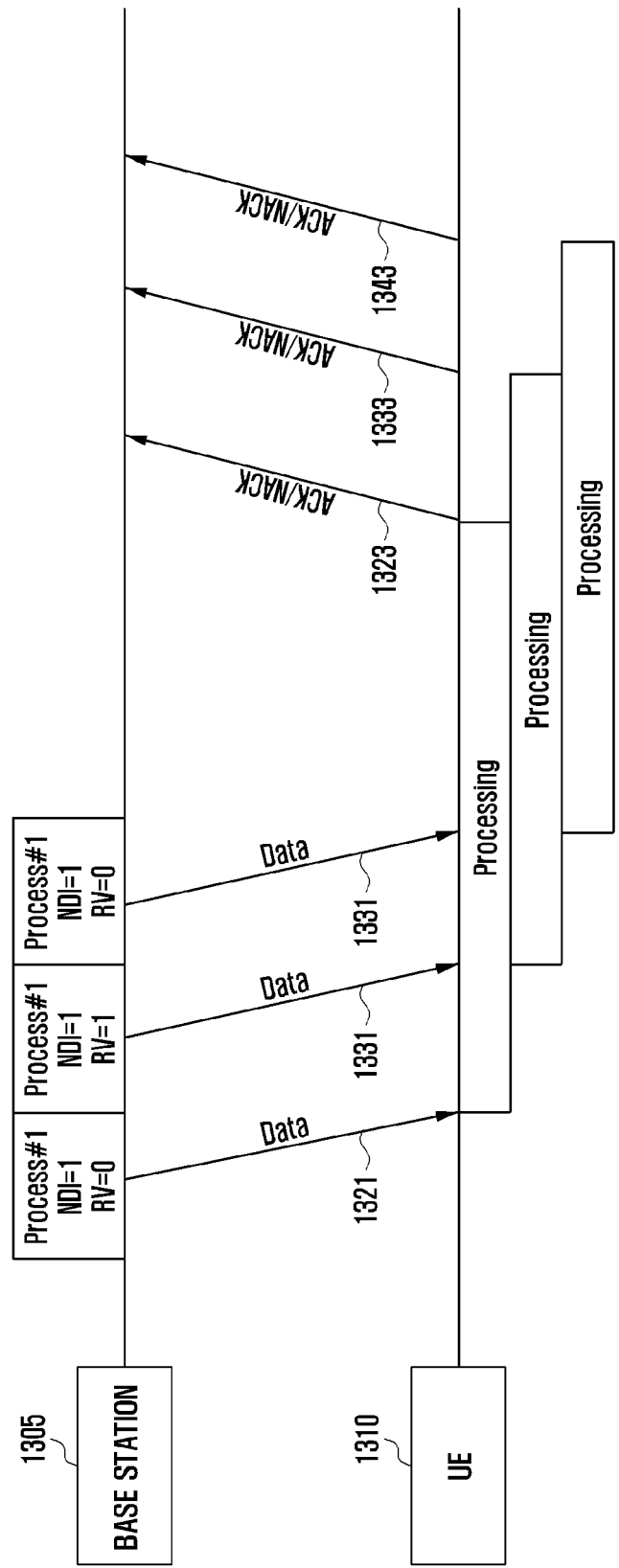
FIG. 13 illustrates a process of performing redundant transmission without feedback in downlink data transmission according to an embodiment of the disclosure.

FIG. 13 illustrates a process of performing redundant transmission without feedback in downlink data transmission according to an embodiment of the disclosure.

At the beginning of FIG. 13, a base station 1305 may notify a UE 1310 of data transmission in HARQ process #1 and may also transmit a packet (operation 1321). Here, the base station indicates that new data is transmitted in HARQ process #1 by assuming an NDI value to be 1 and sets an RV to 0. The UE 1310 may decode this message from a PDCCH, may receive data from a physical resource (physical resource block) corresponding to PDCCH information, and may then report the success/failure of packet transmission through an ACK/NACK message after a predetermined time via processing (operation 1323). Generally, the base station may subsequently perform retransmission depending on the success/failure of data transmission.

In the embodiment of FIG. 13, however, the base station 1305 performs data transmission in the same HARQ process (HARQ process #1 in the embodiment of FIG. 13) with the same NDI value therebefore regardless of the success/failure of corresponding data transmission (operation 1331). Here, the RV value may be changed. The UE 1310 may decode a PDCCH, may receive data from a physical resource (physical resource block) corresponding to PDCCH information, and may then report the success/failure of packet transmission through an ACK/NACK message after a predetermined time via processing (operation 1333). Likewise, the base station 1305 may perform third data transmission. In the embodiment of FIG. 13, it is assumed that such repeated data transmission is performed regardless of the success/failure of data transmission, which enables fast data retransmission and stable transmission. Here, HARQ feedback indicating whether data is successfully received may be transmitted for each data transmission, or only once for data received for a predetermined time.

In the embodiment of FIG. 13, in case that the base station 1305 performs redundant transmission, the base station 1305 may limit a logical channel processed in a corresponding HARQ process. For example, the base station 1305 may be configured to perform transmission separately using logical channels for packet duplication.

FIG. 14 illustrates a dual-connectivity or multi-connectivity environment which enables a connection with a plurality of base stations according to an embodiment of the disclosure.

In the embodiment of FIG. 14, there are four connectable base stations. It is assumed that base station 1 1410, base station 2 1420, and base station 3 1430 include all user plane stacks from a service data adaptation protocol (SDAP) layer to a PHY layer. Base station 4 1440 is configured to include only RLC, MAC, and PHY layers. A base station and a UE need to determine a bearer type to have. The bearer type may be determined in case that the base station and the UE set up a connection or in case that the base station and the UE reconfigure a connection (in a connection reconfiguration procedure). SDAP/PDCP layers may be considered as an upper L2, and RLC/MAC layers may be considered as a lower L2. Depending on the configuration, an upper L2 and a lower L2 are not necessarily included in the same base station. As illustrated in the embodiments in FIG. 1 and FIG. 2, an upper L2 and a lower L2 may be connected via a backhaul interface. This environment may also be seen in a CU-DU-split architecture. According to an embodiment, an upper L2 and a lower L2 in the same base station may be configured together so that a connection via a backhaul interface may not be required.

FIG. 15, FIG. 16, and FIG. 17 illustrate a method of configuring a bearer type in a dual-connectivity or multi-connectivity environment which enables a connection with a plurality of base stations according to an embodiment of the disclosure.

Each bearer may establish a connection with upper L2 and lower L2 of a plurality base stations as shown in FIG. 14. Each bearer may also have different combinations of upper L2s and lower L2s in a UE-base station connection. For example, a signaling radio bearer (SRB) and a data radio bearer (DRB) may have different upper L2s and lower L2s. In addition, among DRBs, DRB1 and DRB2 may have different upper L2s and lower L2s. FIG. 15, FIG. 16, and FIG. 17 illustrate specific embodiments in which a particular bearer is mapped to an upper L2 and a lower L2. Commonly, information required for bearer configuration may include some of the following information.

Bearer ID
ID of base station applying upper L2
Number of base stations applying lower L2
ID of base station applying lower L2
Whether upper L2 is connected to a master base station (here, the master base station is, for example, a base station controlling the RRC of a UE in dual connectivity or multi-connectivity. The master base station may be connected to a core network and may participate in controlling the UE. In the master base station, an SDAP (QoS) layer for the UE may be activated.)
Whether an SDAP layer header is included FIG. 15 illustrates an embodiment of a bearer configuration. The embodiment of FIG. 15 illustrates a configuration in which a particular bearer is connected to an upper L2 of base station 1 1510 and is connected to lower L2s of base station 1 1510 and base station 4 1540. Here, the ID of a base station applying the upper L2, which is the ID of base station 1 1510, the number of base stations applying the lower L2, which is 2, and the ID of a base station applying the lower L2, which is the ID of base station 1 1510 and the ID of base station 4 1540, may be included in case that configuring the bearer. If necessary, it may be indicated whether the base station applying the upper L2 is a master base station. According to an embodiment, a bearer may be configured only for a lower-L2 base station without including the ID of a base station including an upper L2.

FIG. 16 illustrates an embodiment of a bearer configuration. The embodiment of FIG. 16 illustrates a configuration in which a particular bearer is connected to an upper L2 of base station 2 1620 and is connected to a lower L2 of base station 1. Here, the ID of a base station applying the upper L2, which is the ID of base station 2 1620, the number of base stations applying the lower L2, which is 1, and the ID of a base station applying the lower L2, which is the ID of base station 1 1610, may be included in case that configuring the bearer. If necessary, it may be indicated whether the base station applying the upper L2 is a master base station. According to an embodiment, a bearer may be configured only for a lower-L2 base station without including the ID of a base station including an upper L2.

FIG. 17 illustrates an embodiment of a bearer configuration in CU-DU-split architecture. The embodiments of FIG. 14 to FIG. 16 may also be applied to CU-DU-split architecture. In the CU-DU-split architecture, an upper L2 may correspond to a CU, and a lower L2 may correspond to a DU. Here, in the embodiment of FIG. 17, CU-DU-split architecture may be assumed, and a CU and a DU are assumed to be configured as separate entities. FIG. 17 illustrates a configuration in which a particular bearer is connected to an upper L2 of CU 2 1720 and is connected to a lower L2 of DU 1 1715. Here, the ID of a base station applying the upper L2, which is the ID of CU 2 1720, the number of base stations applying the lower L2, which is 1, and the ID of a base station applying the lower L2, which is the ID of DU 1 1715, may be included in case that configuring the bearer. If necessary, it may be indicated whether the base station applying the upper L2 is a master base station. According to an embodiment, a bearer may be configured only for a lower-L2 base station without including the ID of a base station including an upper L2.

FIG. 18 illustrates information for separately setting a sequence number (SN) and a window size according to an embodiment of the disclosure.

In a related art, in case that configuring a bearer, the size of a sequence number may be set in the RRC connection reconfiguration message. In the related art, in case that the size of the sequence number is determined, a window size is determined to be $2^{\wedge}$(number of sequence number bits-1). However, an excessively large window size may make it difficult to implement a communication device. Thus, it is required to reduce the window size.

In the embodiment of FIG. 18, a window size and a sequence number are set separately. The embodiment of FIG. 18 illustrates a PDCP SN and a PDCP window size. However, the embodiment is not limited to a PDCP layer but may be applied to an RLC layer or a layer having a different sequence number. Further, the embodiment of FIG. 18 illustrates a DRB configuration by way of example but may be applied to an SRB configuration. In FIG. 18, for radio bearer 1, an 18-bit sequence number is used and a window size is 2048. A base station and a UE may perform a packet transmission and reception procedure via the bearer on the basis of these values.

Figure 19:
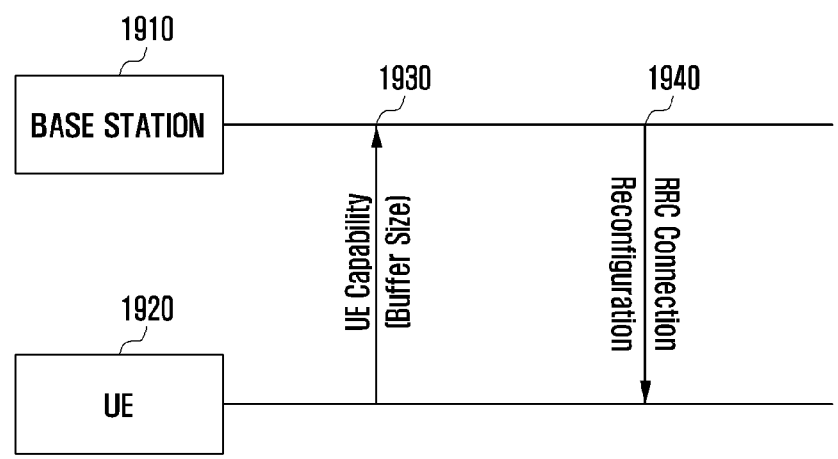
FIG. 19 illustrates a procedure in which a bearer is configured depending on the buffer size according to an embodiment of the disclosure.

FIG. 19 illustrates a procedure in which the bearer configuration of FIG. 18 is determined depending on the UE capability of a buffer size.

A sequence number and a window size are affected by a data transmission rate. Here, in case that the sequence number and the window size are excessively large, a UE and a base station may require a large buffer size. That is, the buffer sizes of the UE 1920 and the base station 1910 may be limited. Therefore, the UE 1920 may notify the base station 1910 of the buffer size of the UE (operation 1930). In case that the buffer size of the UE 1920 is less than or equal to a predetermined level, the base station may set a sequence number size or a window size to a specified value or less (operation 1940). In addition, the UE 1920 may transmit an allowable window size via the UE capability. The base station may set a window size applicable to the UE on the basis of the allowable window size.

Figure 20:
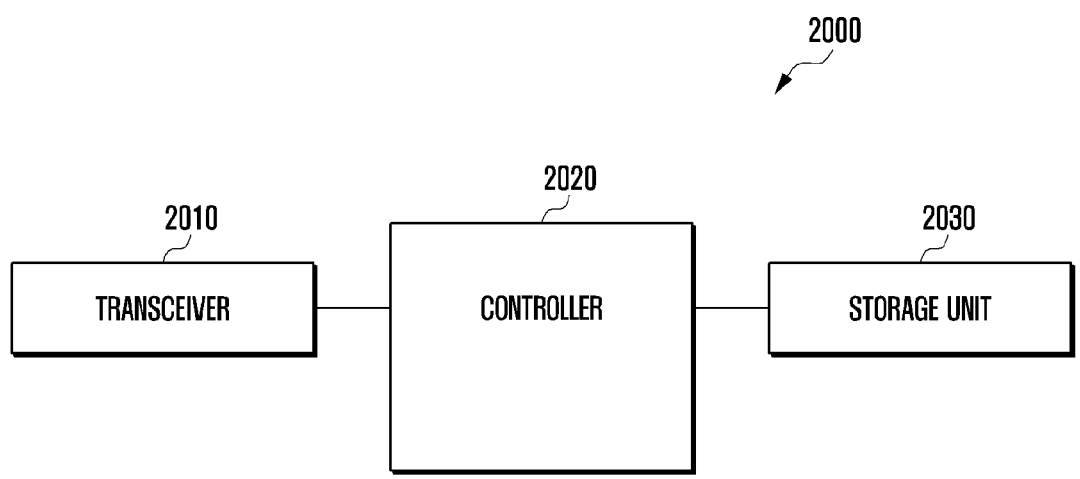
FIG. 20 illustrates the configuration of a UE according to an embodiment of the disclosure.

FIG. 20 illustrates the configuration of a UE according to an embodiment of the disclosure.

Referring to FIG. 20, the UE 2000 may include a transceiver 2010, a controller 2020, and a storage unit 2030. In the disclosure, the controller 2020 may be defined as a circuit, an application-specific integrated circuit, or at least one processor.

The transceiver 2010 may transmit and receive a signal to and from a different network entity. For example, the transceiver 2010 may receive a signal, information, data, a packet, or the like from a base station or may transmit a signal, information, data, a packet, or the like to the base station.

The controller 2020 may control the overall operation of the UE according to the embodiments proposed in the disclosure. The controller 2020 may control the operation of the UE illustrated with reference to FIG. 1 to FIG. 19. The controller 2020 may control the transceiver 2010 and/or the storage unit 2030.

The controller 2020 may receive a signaling radio bearer (SRB) message, may determine whether at least one SRB message is not sequentially received, may identify whether a reordering timer expires in case that the at least one SRB message is not sequentially received, and may determine the loss of the at least one SRB message in case that the reordering timer expires. The SRB message may include a radio resource control (RRC) message or a non-access stratum (NAS) message.

In case that it is determined that the at least one SRB message is lost, the controller 2020 may control a PDCP layer of the reception device to transmit information indicating the loss of the at least one SRB message to an upper layer of the reception device. The information indicating the loss of the at least one SRB message may include the PDCP SN of the lost SRB message and an indicator indicating that the loss of the SRB message.

In addition, the controller 2020 may identify whether the reordering timer is operation in case that the at least one SRB message is not sequentially received, and may control the reordering timer to start in case that the reordering timer is not operating. In addition, in case that the at least one SRB message is lost in a backhaul between dually connected base stations, the controller 2020 may perform control to request retransmission of the lost SRB message from a PDCP layer of a base station, which receives the SRB message from the UE, among the dually connected base stations. Further, the controller 2020 may perform control to request retransmission of the lost SRB message or to transmit a connection reconfiguration request message.

The storage unit 2030 may store at least one of information transmitted and received through the transceiver 2010 and information generated by the controller 2020.

Figure 21:
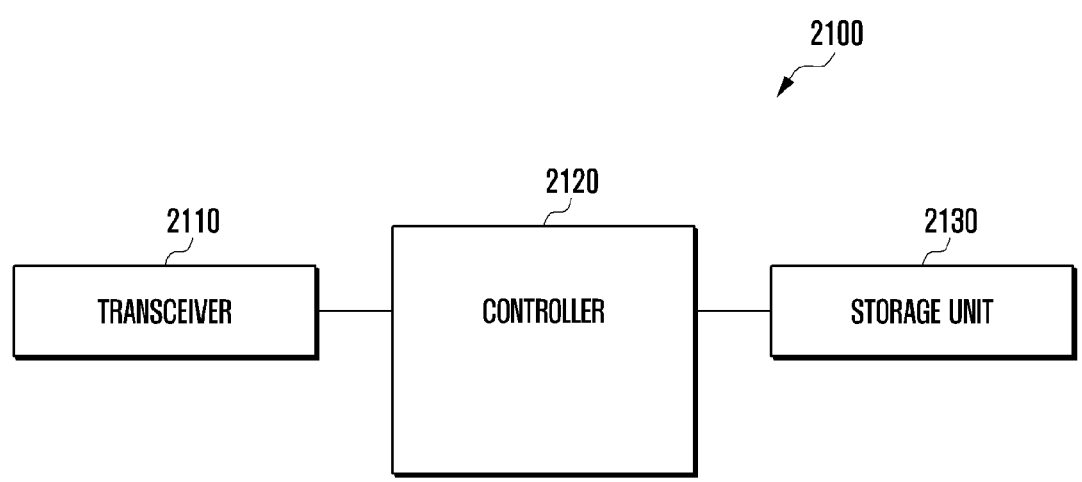
FIG. 21 illustrates the configuration of a base station according to an embodiment of the disclosure.

FIG. 21 illustrates the configuration of a base station according to an embodiment of the disclosure.

Referring to FIG. 21, the base station 2100 may include a transceiver 2110, a controller 2120, and a storage unit 2130. In the disclosure, the controller 2020 may be defined as a circuit, an application-specific integrated circuit, or at least one processor.

The transceiver 2110 may transmit and receive a signal to and from a different network entity. For example, the transceiver 2110 may receive a signal, information, data, a packet, or the like from a UE or may transmit a signal, information, data, a packet, or the like to the UE.

The controller 2120 may control the overall operation of the base station according to the embodiments proposed in the disclosure. The controller 2120 may control the operation of the base station illustrated with reference to FIG. 1 to FIG. 19. The controller 2120 may control the transceiver 2110 and/or the storage unit 2130.

The controller 2120 may receive a signaling radio bearer (SRB) message, may determine whether at least one SRB message is not sequentially received, may identify whether a reordering timer expires in case that the at least one SRB message is not sequentially received, and may determine the loss of the at least one SRB message in case that the reordering timer expires. The SRB message may include a radio resource control (RRC) message or a non-access stratum (NAS) message.

In case that it is determined that the at least one SRB message is lost, the controller 2120 may control a PDCP layer of the reception device to transmit information indicating the loss of the at least one SRB message to an upper layer of the reception device. The information indicating the loss of the at least one SRB message may include the PDCP SN of the lost SRB message and an indicator indicating the loss of the SRB message.

In addition, the controller 2120 may identify whether the reordering timer is operating in case that the at least one SRB message is not sequentially received, and may control the reordering timer to start in case that the reordering timer is not operating. Further, the controller 2120 may perform control to request retransmission of the lost SRB message or to transmit a connection reconfiguration request message.

The storage unit 2130 may store at least one of information transmitted and received through the transceiver 2110 and information generated by the controller 2120.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method of a reception device, the method comprising:
   receiving a signaling radio bearer (SRB) message;
   determining whether at least one SRB message is not sequentially received;
   identifying whether a reordering timer expires in case that the at least one SRB message is not sequentially received;
   determining loss of the at least one SRB message in case that the reordering timer expires; and requesting retransmission of a lost SRB message from a packet data convergence protocol (PDCP) layer of a base station, which receives another SRB message from the reception device, among base stations for dual connectivity in case that the at least one SRB message is lost in a backhaul between the base stations for dual connectivity.

2. The method as claimed in claim 1, further comprising transmitting, by the PDCP layer of the reception device, information indicating the loss of the at least one SRB message to an upper layer of the reception device in case that it is determined that the at least one SRB message is lost.

3. The method as claimed in claim 2, wherein the information indicating the loss of the at least one SRB message includes a PDCP sequence number (SN) of the lost SRB message and an indicator indicating the loss of the SRB message.

4. The method as claimed in claim 1, wherein the SRB message includes a radio resource control (RRC) message or a non-access stratum (NAS) message.

5. The method as claimed in claim 1, further comprising:
identifying whether the reordering timer is operating in case that the at least one SRB message is not sequentially received; and
starting the reordering timer in case that the reordering timer is not operating.

6. The method as claimed in claim 1, further comprising:
requesting retransmission of a lost SRB message; or
transmitting a connection reconfiguration request message.

7. A reception device comprising:
a transceiver configured to transmit and receive a signal; and
a controller configured to:
receive a signaling radio bearer (SRB) message,
determine whether at least one SRB message is not sequentially received,
identify whether a reordering timer expires in case that the at least one SRB message is not sequentially received,
determine loss of the at least one SRB message in case that the reordering timer expires, and
request retransmission of a lost SRB message from a packet data convergence protocol (PDCP) layer of a base station, which receives another SRB message from the reception device, among base stations for dual connectivity in case that the at least one SRB message is lost in a backhaul between the base stations for dual connectivity.

8. The reception device as claimed in claim 7, wherein in case that it is determined that the at least one SRB message is lost, the controller is configured to control the PDCP layer of the reception device to transmit information indicating the loss of the at least one SRB message to an upper layer of the reception device.

9. The reception device as claimed in claim 8, wherein the information indicating the loss of the at least one SRB message includes a PDCP sequence number (SN) of the lost SRB message and an indicator indicating the loss of the SRB message.

10. The reception device as claimed in claim 7, wherein the SRB message includes a radio resource control (RRC) message or a non-access stratum (NAS) message.

11. The reception device as claimed in claim 7, wherein the controller is configured to identify whether the reordering timer is operating in case that the at least one SRB message is not sequentially received, and to start the reordering timer in case that the reordering timer is not operating.

12. The reception device as claimed in claim 7, wherein the controller is configured to:
request retransmission of a lost SRB message, or
transmit a connection reconfiguration request message.

* * * * *